United States Patent
Dubey et al.

(10) Patent No.: US 8,299,426 B2
(45) Date of Patent: Oct. 30, 2012

(54) CONDUCTIVE CONDUITS FOR CHEMICAL ANALYSES, AND METHODS FOR MAKING SUCH CONDUITS

(75) Inventors: Ananya Dubey, Redwood City, CA (US); Jeffrey W. Finch, Gig Harbor, WA (US); Jennifer H. Granger, Salt Lake City, UT (US); James P. Murphy, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 655 days.

(21) Appl. No.: 11/916,228

(22) PCT Filed: May 24, 2006

(86) PCT No.: PCT/US2006/020114
§ 371 (c)(1),
(2), (4) Date: Jun. 16, 2010

(87) PCT Pub. No.: WO2006/130408
PCT Pub. Date: Dec. 7, 2006

(65) Prior Publication Data
US 2011/0042566 A1   Feb. 24, 2011

Related U.S. Application Data

(60) Provisional application No. 60/686,733, filed on Jun. 2, 2005.

(51) Int. Cl.
*H01J 49/26* (2006.01)
(52) U.S. Cl. .................. 250/288; 250/281; 250/282
(58) Field of Classification Search .................. 250/281, 250/282, 288
See application file for complete search history.

(56) References Cited

U.S. PATENT DOCUMENTS

| | | | |
|---|---|---|---|
| 4,009,424 A | 2/1977 | Itoh |
| 4,452,832 A | 6/1984 | Wrenn, Jr. et al. |
| 6,387,256 B1 | 5/2002 | Tuvim |
| 6,527,951 B1 | 3/2003 | Tuvim |
| 6,670,607 B2 | 12/2003 | Wood et al. |
| 6,703,611 B2 | 3/2004 | Glish et al. |

(Continued)

FOREIGN PATENT DOCUMENTS

JP   50052813   3/1993

(Continued)

OTHER PUBLICATIONS

Dahlin et al. "Capillary electrophoresis coupled to mass spectrometry from a polymer modified poly(dimethylsiloxane) microchip with an integrated graphite electrospray chip", The Analyst, 2005, 130, pp. 193-199.*

(Continued)

*Primary Examiner* — David A Vanore
*Assistant Examiner* — Nicole Ippolito
(74) *Attorney, Agent, or Firm* — Waters Technologies Corp.

(57) ABSTRACT

A method for making a fluid-processing apparatus involves mixing a colloidal suspension with a matrix material, applying the mixture to a surface of a conduit, and curing the applied mixture to provide a conductive coating. A fluid-processing apparatus includes a conduit and a conductive layer adjacent to a surface of the conduit. The conductive layer includes graphite particles embedded in a matrix. The fluid-processing apparatus supports, for example, electrospray-ionization for mass spectrometry, capillary electrophoresis, or capillary electro-chromatography.

34 Claims, 4 Drawing Sheets

U.S. PATENT DOCUMENTS

| | | | |
|---|---|---|---|
| 2003/0141392 | A1 | 7/2003 | Nilsson et al. |
| 2005/0029442 | A1 | 2/2005 | Takats et al. |
| 2006/0159916 | A1* | 7/2006 | Dubrow et al. ............... 428/357 |

FOREIGN PATENT DOCUMENTS

| | | |
|---|---|---|
| JP | 2003043014 | 2/2003 |
| WO | 0150820 | 7/2001 |

OTHER PUBLICATIONS

W. Franklin Smyth, Recent applications of capillary electrophoresis-electrospray ionisation-mass spectrometry in drug analysis, Electrophoresis, 2005, pp. 1-24, vol. 26, Wiley-VCH Verlag GmbH & Co. KGaA, Weinheim.

Xiaofeng Zhu et al, A Colloidal Graphite-Coated Emitter for Sheathless Capillary Electrophoresis/Nanoelectrospray Ionozation Mass Spectrometry, 2002, pp. 5405-5409, vol. 74, Analytical Chemistry.

Stefan Nilsson, Development of Sheathless Electrospray Mass Spectrometry and Investigations of Associated Electrochemical Process—A Fairy Tale, 2004, pp. 7-41.

Stefan Nilsson et al, Evaluations of the Stability of Sheathless Electrospray Ionization Mass Spectrometry Emitters Using Electrochemical Techniques, Analytical Chemistry, 2001, pp. 4607-4616, vol. 73, American Chemical Society.

Magnus Wetterhall et al, A Conductive Polymeric Material Used for Nanospray Needle and Low-Flow Sheathless Electrospray Ionization Applications, Analytical Chemistry, 2002, pp. 239-245, vol. 74, American Chemical Society.

Dahlia, Andreas Pettersson; "Capillary electrophoresis coupled to mass spectrometry from a polymer modified poly (dimethylsiloxane) microchip with an integrated graphite electrospray tip"; The Royal Society of Chemistry 2005, Analyst, 2005, 130, 193-199.

Stefan Nilsson et al, A simple and robust conductive graphite coating for sheathless electrospray emitters used in capillary electrophoresis/mass spectrometry, Rapid Communications in Mass Spectrometry, 2001, pp. 1997-2000, vol. 15, John Wiley & Sons, Ltd.

I. González et al, Rheological and electrical characterization of highly conducting polyaniline gels, Polymer Science and Technology Department and Polymer Institute POLYMAT, 2002.

J. Stejskal, Polyaniline. Preparation of a Conducting Polymer (IUPAC Technical Report), Pure Applied Chemistry, 2002, pp. 857-867, vol. 74, Inernational Union of Pure and Applied Chemistry.

Terry Koerner et al, Porous Polymer Monolith Assisted Electrospray, Analytical Chemistry, 2004, pp. 6456-6460, vol. 76, American Chemical Society.

* cited by examiner

CONDUCTIVE CONDUITS FOR CHEMICAL ANALYSES, AND METHODS FOR MAKING SUCH CONDUITS

CROSS REFERENCE TO RELATED APPLICATIONS

This application is the National Stage of International Application No. PCT/US2006/020114, filed on 24 May 2006, which claims priority to and benefit of U.S. Provisional Application Ser. No. 60/686,733, filed Jun. 2, 2005. The entire contents of these applications are expressly incorporated herein by reference in their entirety.

TECHNICAL FIELD

The invention generally relates to analyses of chemical compounds, and, more particularly, to conduits, and methods for making conduits, for use in the analysis of chemical compounds.

BACKGROUND INFORMATION

Various chemical-analysis instruments utilize conduits, such as tubes, columns, and capillaries, for separation of compounds and/or delivery of fluids. For example, techniques such as liquid chromatography (LC), capillary electrophoresis (CE) and capillary electro-chromatography (CEC) separate compounds as the compounds pass through a conduit. In contrast, for example, an electrospray ionization (ESI) interface typically includes an emitter conduit through which a chromatographically separated eluent passes to create an ionized aerosol for mass-spectrometric analyses. through and/or exiting from the conduit. CEC, for example, utilizes an electro-osmotic flow (EOF) to propel a mobile phase through a chromatographic column. In contrast, high-performance liquid chromatography (HPLC) relies on an applied fluid pressure to propel a mobile phase through a chromatographic column.

For LC, CE, and CEC, for example, ESI is often used to provide an interface between a chromatographic conduit and a mass spectrometer. In an ESI interface, a voltage of approximately 3 keV to 4 keV is typically applied between an emitter capillary and a counter electrode spaced from an exit orifice of the emitter capillary. In contrast, for example, for CE and CEC instruments, a voltage is typically applied between electrodes located at either end of a conduit. To permit application of a voltage, a conduit is typically formed from a conductive material or includes conductive components.

In ESI, for example, a chromatographic eluent, including the analyte and solvent, is often forced by a carrier gas through a metallic capillary. A charge is transferred from the capillary to an aerosol of analyte and solvent sprayed from an exit orifice of the capillary. Typically, a neutral carrier gas is mixed with the aerosol to promote evaporation of the solvent and formation of separated ionized analyte molecules suited to mass-spectrometric analysis.

A variety of capillary diameters are used in emitters in ESI interfaces. For example, relatively narrow capillaries are often used for "nanospray" ESI to support, for example, smaller samples sizes and/or provide softer ionization of samples.

In some cases, instead of a metal capillary, an ESI emitter includes an insulating tube and a conductive electrode layer. For example, some ESI emitters are fabricated from non-conductive glass or fused-silica capillaries. The tips of such emitters are often made very small, e.g., a few micrometers in diameter, by pulling of the capillary tip. A voltage is applied to the emitter via, for example, a liquid contact to an electrode disposed away from the emitter tip, or, for example, via a gold coating on the non-conductive capillary. Such approaches, however, are often difficult to fabricate or control, and at times have less than desirable chemical and mechanical stability or durability.

SUMMARY OF THE INVENTION

The invention arises, in part, from the realization that a robust conductive coating for conduits used in chemical analyses can be fabricated by utilizing a mixture of colloidal suspension of graphite and a curable compound, such as a siloxane chemical group compound. The coating, in various embodiments, has good uniformity, conductivity, durability, and/or regenerative capability. Such a coating in combination with, for example, a silica capillary, provides, for example, good adhesion, good hydrophobicity, and/or low susceptibility to electrical arcing. Moreover, some embodiments of the invention provide an ESI emitter integrated with a chromatography column.

Accordingly, one embodiment of the invention features a method for making a fluid-processing apparatus for chemical analyses. The method includes mixing a colloidal suspension with a matrix material, applying the mixture to a surface of a conduit, and curing the applied mixture. The cured mixture provides a conductive coating via which a voltage is applied to a fluid passing through the conduit. The colloidal suspension suitably includes, for example, graphite particles. The fluid-processing apparatus is variously implemented as, for example, an ESI interface, a CE apparatus, a CEC apparatus, or an electrokinetic pump. In some implementations, the conduit is a capillary and supports processing of relatively small amounts of fluid.

A second embodiment of the invention features a method for making an analytical instrument. The instrument includes a chromatography module, a mass-spectrometry module, and an ESI interface in fluid communication with the chromatography module and the mass-spectrometry module.

Another embodiment of the invention features a method for analyzing a compound. The method includes unclogging a tip of an emitter conduit by cleaving or cutting the emitter conduit to remove a clogged portion of the, emitter conduit.

Still another embodiment of the invention features an analytical instrument. The instrument includes a chromatography module, a mass-spectrometry module, and an ESI interface in fluid communication with the chromatography module and the mass-spectrometry module for converting an eluent received from the chromatography module into an electrospray aerosol for delivery to the mass-spectrometry module.

Further embodiments of the invention feature coated component(s) other than conduits. Such embodiments include, for example, matrix-assisted laser desorption/ionization (MALDI) plates and desorption/ionization on silicon (DIOS) chips.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

The phrases "chromatographic system," "chromatographic module," "chromatographic instrument," and the like herein refer to equipment used to perform chemical separations. Such equipment is a portion of an instrument that includes other components or is a standalone unit. Chromatography equipment typically moves fluids under pressure and/or electrical forces.

Some embodiments of the invention involve instruments that include both chromatographic components and mass-spectrometric components. In some of these embodiments, a chromatographic component is placed in fluid communication with a mass-spectrometric component through use of an appropriate interface, such as an ESI interface. Some appropriate interfaces at times create or maintain separated materials in an ionic form and typically place a stream of fluid containing the ions into an atmosphere where the stream is vaporized and the ions are received in an orifice for mass-spectrometric analyses. Depending on context, the description provided herein of some illustrative embodiments of the invention uses the word "conduit" to refer to, for example, a "capillary," a "tube," and/or a "pipe."

For simplicity of description, some illustrative embodiments of the invention are described herein in terms of "interfaces," "emitters," and/or "conduits." It should be understood that the use of these words is not-intended to limit the scope of the invention to ESI interfaces, emitters included in ESI interfaces, or specific conduits. Accordingly, features illustrated by embodiments described herein are applicable to, for example, embodiments of the invention relating to ESI interfaces, LC, CE, and CEC equipment, electrokinetic pumps, and other conduit-based chemical analysis-related components.

The terms "nanospray" and "nanoelectrospray," as used herein, refer to ESI interfaces that provide relatively low flow rates, typically less than approximately 1000 nanoliters/minute (i.e., less than approximately 1.0 microliter/minute.)

Figure 1:
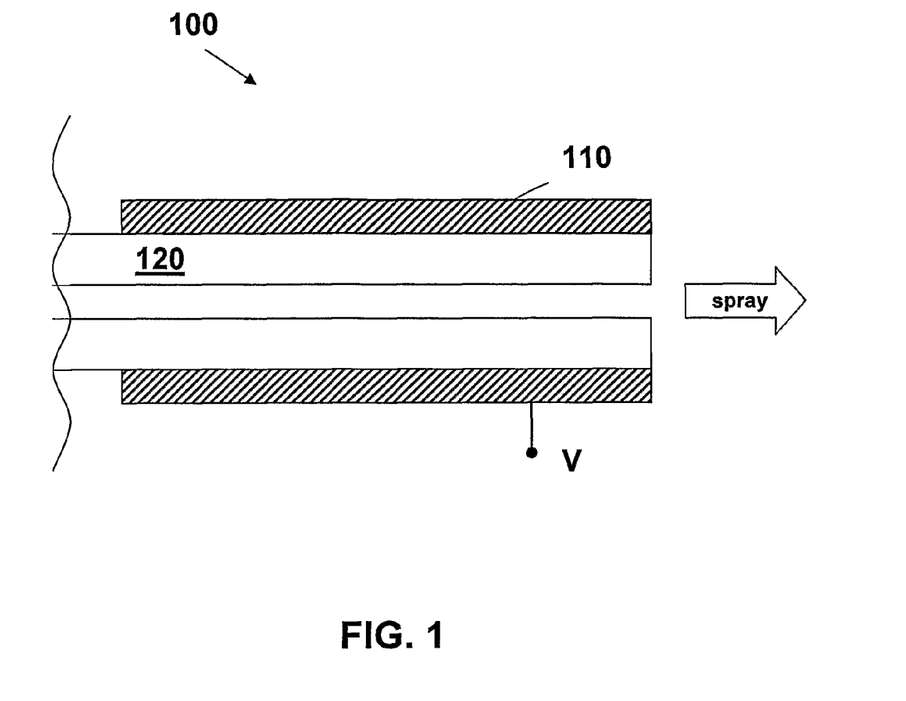
FIG. 1 is a cross-sectional diagram of a portion of a fluid-processing interface, in accordance with one embodiment of the invention.

FIG. 1 illustrates a cross-sectional view of a portion of a fluid-processing apparatus 100, in accordance with one embodiment of the invention. The apparatus 100 includes a conduit 120 and a conductive coating 110 adjacent to the conduit 120. The conduit 120 is any suitable conduit, for example, a capillary known to one having ordinary skill in mass spectrometry or chromatography.

The conduit 120 can be formed from, for example, metallic and/or insulating materials. Suitable materials include known materials such as steel, fused silica, or lined materials. The conduit 120 can include more than one tube. For example, the conduit 120 can include one or more capillaries. In contrast to some conventional ESI emitters, the conduit can be formed of glass or fused silica without forming a pulled tip. The apparatus 100, in some more detailed embodiments of the invention is, for example, an ESI-emitter interface, a CE column, or a CEC column.

The conductive coating 110 is adjacent to all or a portion of the exterior surface of the conduit 120. The coating 110 acts as an electrode for application of a voltage to a fluid in the conduit 120. The conductive coating 110, in alternative embodiments of the invention, includes one portion, or two or more physically separate portions. For example, to perform CE or CEC, some embodiments of the invention include portions of a conductive coating 110 disposed at opposite ends of a conduit 120.

In alternative embodiments of the invention, the coating 110 is non-homogeneous. For example, the coating 110, in some embodiments, has multiple layers. In one such embodiment, the coating 110 includes a layer of a matrix material in contact with the conduit 120, and a layer of a composite material, including the matrix material and conductive particles, on the layer of matrix material.

Some embodiments include an additional layer or layers located between the conductive coating 110 and the conduit 120. Some optional coatings, for example, promote adhesion of the coating 120 to the conduit 110. Similarly, some alternative embodiments of the invention include an additional layer or layers disposed on the conductive layer 110 to, for example, protect the conductive layer 110 from chemical and/or mechanical damage. A layer(s) of a matrix material, such as the above-described matrix material, can provide an adhesive layer and/or a protective coating layer. Such layers, in some embodiments, include conductive particles at a lower density than the density of particles in some embodiments of the conductive layer 110.

The conductive layer 110 includes graphite particles embedded in a matrix material that includes a cured polymeric material. The material, in some embodiments of the invention, is a thermoset polymer. The polymer, in various embodiments includes an organic and/or inorganic polymer. One preferred matrix material is a siloxane-based thermoset polymer, for example, poly(dimethyl siloxane) (PDMS). For electrospray applications, the conductive coating 110 preferably has a hydrophobic surface.

For example, the matrix material in some embodiments of the invention includes a compound having a chemical structure of, wherein each R optionally independently selected from the group including H, $CH_2$, $CH_3$, $CH=CH_2$, $CH_2=CH_2$, $CH_3=CH_3$, CHOH, aminoalkyl, and hydroxyalkyl.

The conductive layer 110 optionally has a substantially uniform thickness. This thickness is optionally selected to be greater than approximately 20 μm. The thickness is selected to provide one or more desired characteristics, such as a desired level of mechanical durability. Some illustrative methods for fabricating layers having a uniform thickness and/or having a particular thickness value are described below with reference to FIGS. 2a, 2b, and 2c.

Some embodiments of the invention are ESI interfaces having an ESI emitter. Such emitters optionally include a capillary and a conductive coating having features of the apparatus 100 described with reference to FIG. 1. In view of the description provided herein, one having ordinary skill in the mass-spectrometry arts will understand that some implementations of ESI interfaces support ionization of liquid samples derived from, for example, LC, CE, and/or CEC equipment.

Some of these ESI interfaces suitably support nanospray ESI. To support nanospray ESI, a capillary has any suitable inner diameter, for example, an inner diameter of less than approximately 100 μm, for example, a diameter in a range of approximately 1 μm to approximately 50 μm, for example, a diameter of approximately 20 μm. A capillary, in various embodiments of the invention, need not have a pulled tip. That is, in one preferred embodiment, the capillary has a substantially uniform inner diameter and a substantially uniform outer diameter.

In an ESI emitter, according to some embodiments, a conductive coating is disposed along an emitter-tip end of a capillary, that is, adjacent to an exit orifice of the capillary. Optionally the coating covers the entire outer surface of the capillary.

Electrokinetic micropumps (EK pumps) use electroosmosis in charged porous media to generate pressure and flow in microdevices. EK pumps are realized by applying voltage across a porous bed, typically a monolithic porous polymer or a bed of packed silica particles.

Some embodiments of the invention entail electrokinetic pumps, some of which include a capillary through which a fluid is pumped. Some of these embodiments include no moving parts, a good frequency response, and/or the ability to accurately control flow at high-pressure and low flow rates. Some of these embodiments support miniaturized liquid chromatography systems as well as miniaturized catalytic reactors.

Figure 2A:
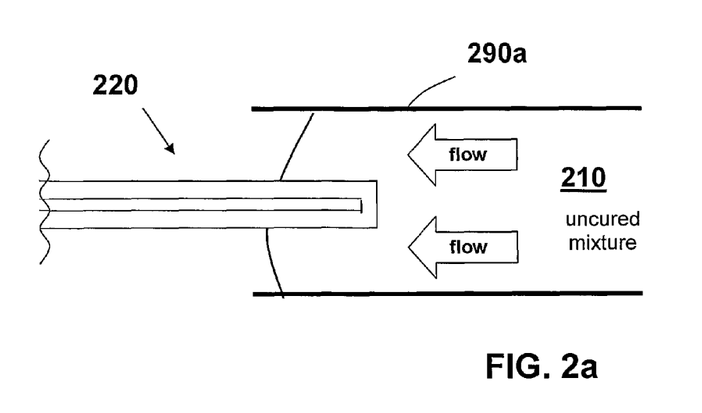
FIG. 2a is a cross-sectional view of a portion of a conduit and a housing through which an uncured mixture of a coating material flows for application to the conduit, in accordance with one embodiment of the invention.
Figure 2B:
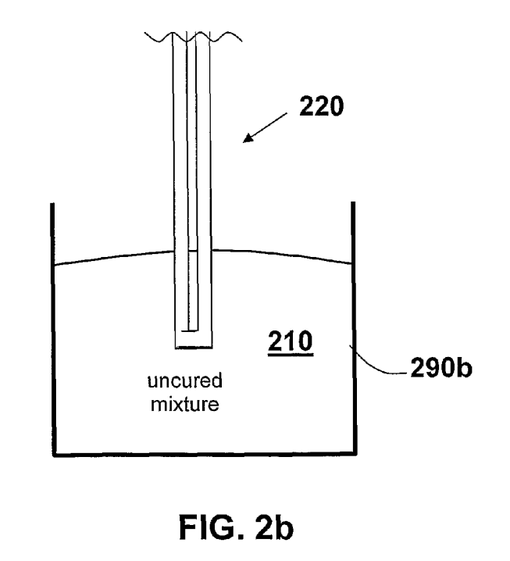
FIG. 2b is a cross-sectional view of a portion of a conduit, similar to that in FIG. 3a, being dipped in an uncured mixture held in a housing, in accordance with one embodiment of the invention.
Figure 2C:
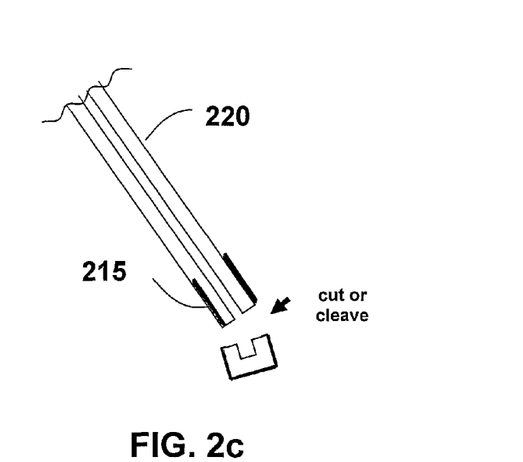
FIG. 2c is a cross-sectional view of a conduit after application of a conductive coating and tip removal, in association with FIG. 2a and FIG. 2b.

Next referring to FIG. 2a, FIG. 2b, and FIG. 2c, methods for making and methods for regenerating fluid-processing interfaces, such as the apparatus 100, are described, in accordance with further embodiments of the invention. The methods support reproducible manufacturing processes.

FIG. 2a is a cross-sectional view of portions of a conduit 220 and a housing 290a through which an uncured mixture 210 of a coating material flows for application to the conduit 220. This figure illustrates a method for making a fluid-processing apparatus for chemical analyses, in accordance with one embodiment of the invention. The method is suitable, for example, for fabrication of the fluid-processing apparatus 100 described with respect to FIG. 1.

The method includes mixing a colloidal suspension with a matrix material to form the uncured mixture 210, applying the mixture 210 to at least a portion of the surface of the conduit 220, and curing the applied mixture 210. A cured coating 215 provides a conductive material for applying a voltage to a fluid passing through the conduit 220 to support processing of the fluid. For example, the conduit is then optionally used as an ESI emitter. Alternatively, for example, the conduit is used for separation of compounds present in a fluid.

The uncured mixture 210 is applied to the conduit 220 in any suitable way. For example, as illustrated in FIG. 2a, the conduit 220 is positioned within an orifice of the housing 290a, and the mixture is caused to flow through the housing 290a and into contact with the conduit 220. Application of the mixture 210 in this manner will often provide a more uniform coating than provided by, for example, application of the mixture 210 by brushing.

The housing 290a is any suitable housing, for example, a tube. To promote reproducible manufacturing, the mixture is directed through the housing in a manner that optionally provides control over a flow rate and/or other flow-related parameter(s). For example, the mixture 210 is optionally pumped through the housing 290a from a pump such as a syringe.

In one alternative embodiment, the housing 290a is part of, or connected to, a t-connector. The mixture 210 is directed through a first orifice of the t-connector, and the conduit 220 is positioned within an orifice of the housing 290a, as described above.

The colloidal suspension and the matrix material each include any suitable materials. For example, the colloidal suspension is, or includes, colloidal graphite. One suitable commercially available colloidal graphite is PELCOC) colloidal graphite, which includes graphite and isopropanol (available from Ted Pella, Inc., Redding, Calif.)

Some suitable matrix materials include, for example, thermoset polymers. Some suitable thermoset polymers include members of the chemical group of siloxane materials, for example, PDMS, as described above with reference to FIG. 1. In one illustrative example of implementation of the above-described method, a PDMS-based uncured matrix material is prepared by mixing a base material and a curing agent.

The base material and the curing agent are mixed in a volume ratio of, for example, 10:1. Next, for example, the uncured matrix material is mixed with colloidal graphite in a volume ratio of 1:3. Alternatively, a base material, a curing agent, and a colloidal suspension are mixed with one another in any suitable sequence.

In some alternative embodiments, a ratio of matrix material to colloidal suspension is selected to provide, for example, a desired viscosity of the mixture to be applied to the conduit. The viscosity is chosen, for example, to provide a desired coating thickness and/or uniformity. Alternatively, the ratio is chosen to provide a desired level of conductivity of the coating after curing. In some alternatives, the ratio is chosen in response to a selected balance between mechanical durability and conductivity of the coating. For example, in some implementations, a graphite volume composition in the cured coating is chosen to be great enough for sufficient conductivity and small enough for sufficient adhesion to the conduit.

After application of the uncured mixture, the mixture is cured. The mixture is cured, for example, via heating. One example of a cure via heating, for a PDMS-colloidal graphite mixture, is heating to a temperature of approximately 110° C. for a duration of approximately 12 hours.

A temperature and time of cure are suitably selected, for example, to provide a substantially full cure without overcuring. If under-cured, the coating at times will be softer than a fully cured coating. If over-cured, the coating will at times be more brittle than a properly cured coating.

FIG. 2b is a cross-sectional view of a portion of the conduit 220 and a vessel 290b containing the uncured mixture 210 for application to the conduit 220. This figure illustrates another method for making a fluid-processing interface for chemical analyses, in accordance with one embodiment of the invention. In this illustrative embodiment, the conduit 220 is dipped in the uncured mixture 210 held in a housing, in this case, the vessel 290a.

In the above-described and some other alternative embodiments, the conduit (as illustrated) has a sealed end. The sealed end is advantageously utilized to avoid entry of the mixture 210 within the conduit 220. The end of the conduit 220 is sealed, for example, via use of a laser or other suitable means.

Some embodiments of the invention involve two or more coatings of the same coating mixtures and/or different coating mixtures, as described above with reference to FIG. 1.

Additional coatings are applied via the above-described techniques, for example. Thus, for example, a conduit may be dipped multiple times to produce a desired multilayer coating. For example, an initial layer may be PDMS, and a subsequent layer may include graphite particles embedded in PDMS to provide a desired level of conductivity.

FIG. 2c is a cross-sectional view of the conduit 220 with the conductive cured coating 215. To open the end of the conduit 220, a portion of a tip of the conduit 220 is removed via, for example, cleaving or cutting. The conduit 220 is cut, for example, with a ceramic, diamond, or sapphire cutting or cleaving tool.

Moreover, if the opened tip of the conduit 220 becomes clogged, worn, and/or damaged due to use in, for example, an ESI interface, the conduit can be opened or regenerated by similarly removing a portion of the conduit 220. The ability to regenerate an ESI emitter, in accordance with some embodiments of the invention, is advantageous over some prior emitters, such as some pulled glass-based emitters.

A variety of apparatus, in accordance with a variety of embodiments of the invention, are produced via a variety of alternative embodiments related to the above-described method. Such apparatus include one or more conduits, as described above, and/or other substrates to which a coating(s) is applied.

For example, in some embodiments, the substrate is associated with, for example, a matrix-assisted laser desorption/ionization (MALDI) plate, a desorption/ionization on silicon (DIOS) chip, or other sample-related substrate. Accordingly, although some embodiments described herein involve conduits, the invention encompasses embodiments that include non-tubular-shaped substrates.

Figure 3:
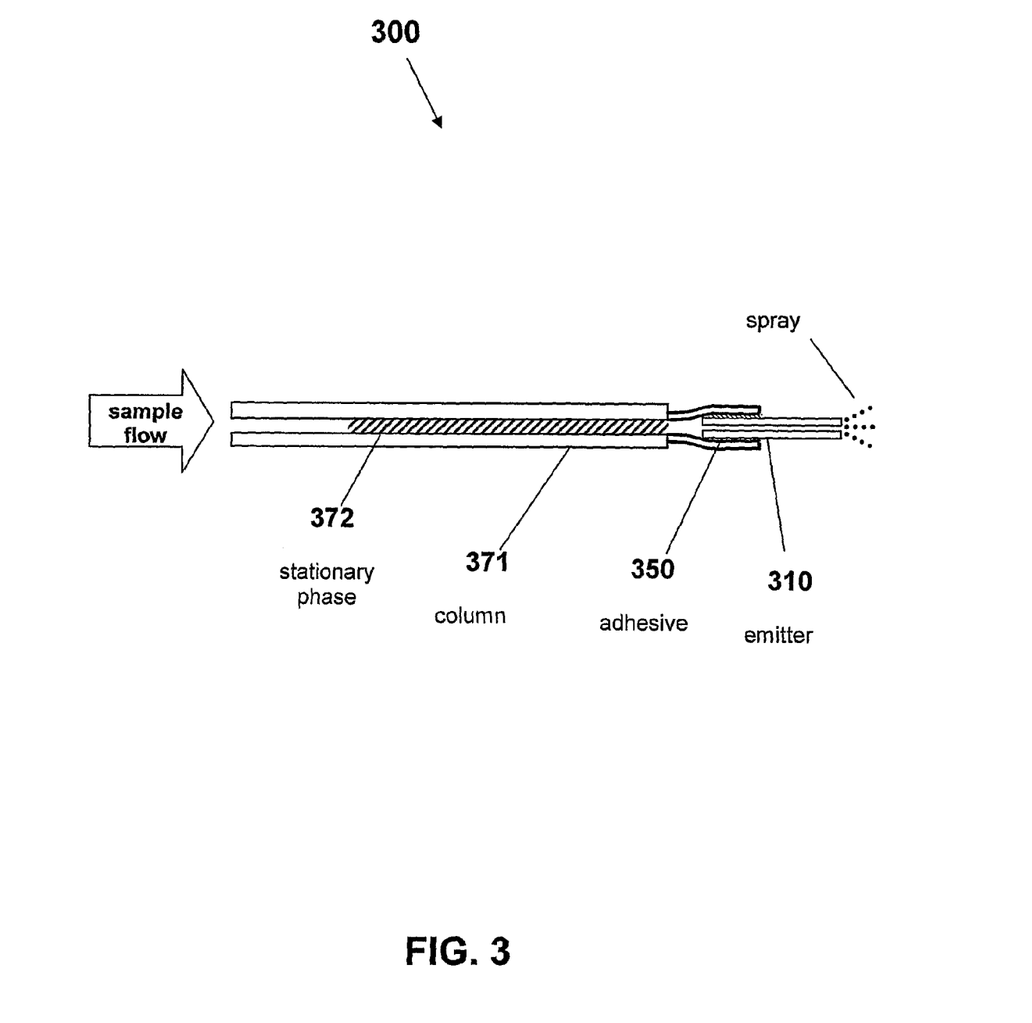
FIG. 3 is a block diagram of a fluid-processing interface for inclusion in an analytical instrument, in accordance with one embodiment of the invention.

FIG. 3 is a block diagram of an embodiment of a fluid-processing interface 300 for inclusion in an analytical instrument, in accordance with one embodiment of the invention. The interface 300 includes an ESI emitter 310 (including, for example, a first capillary have a conductive coating,) a chromatographic conduit 371 (such as a second capillary,) a stationary phase 372 packed in the conduit 371, and an adhesive 350 that secures the conduit 371 to the emitter 310. The interface 300 is used, for example, as an integrated column-emitter in an LC/mass spectrometry system. The ESI emitter 310 is similar, for example, to the apparatus 100 described with reference to FIG. 1.

The conduit 371 is any column suitable for chromatographic separations, including, for example, capillaries and columns known to one having ordinary skill in chromatography. The conduit 371 is formed from, for example, metallic or insulating materials. Suitable materials include those known to one having ordinary skill in the chromatographic arts, such as steel, fused silica, or lined materials. The conduit 371, in some alternative embodiments, includes more than one tube. The conduit 371 is optionally a capillary column, and optionally includes multiple capillary tubes.

The adhesive 350 is any adhesive, including known adhesives, that is suitable for attaching chromatography column to an emitter capillary. The adhesive includes, for example, PDMS.

The interface 300 provides, for example, a conveniently integrated column-emitter. The emitter tip is optionally regenerated by removing a worn and/or clogged portion of the tip, as described above with reference to FIG. 2c.

Figure 4:
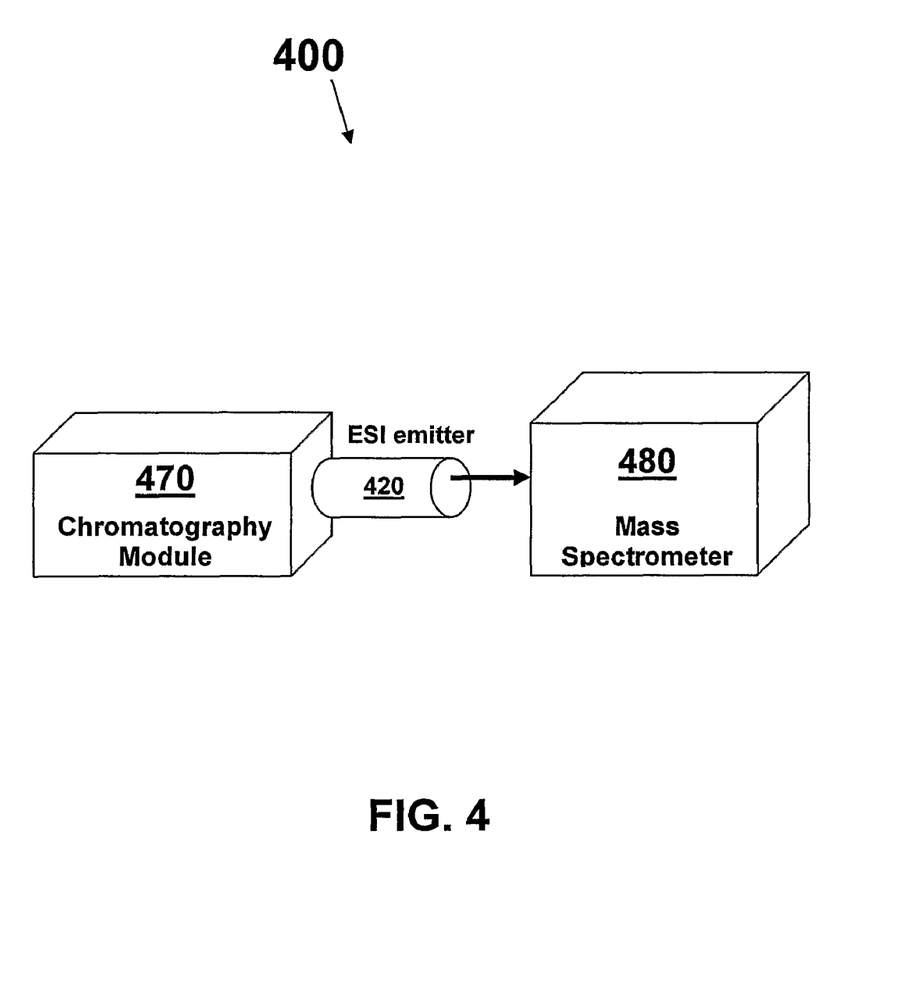
FIG. 4 is a block diagram of an analytical instrument, in accordance with one embodiment of the invention.

FIG. 4 is a block diagram of an embodiment of an analytical instrument 400, in accordance with one embodiment of the invention. The instrument 400 includes a chromatographic module 470, a mass-spectrometry module 480, and an ESI interface 420. The interface 420 receives eluent from the chromatographic module 470, and directs ionized portions of the eluent to the mass-spectrometry module 480. In some alternative embodiments, the interface 420 has features similar to embodiments described above with reference to FIG. 1., FIG. 2, and/or FIG. 3.

The chromatographic module 470 includes any suitable chromatography instrument(s), including known instruments, such as column-based instruments. Suitable columns include columns known to one having ordinary skill in the chromatographic arts. The column can be formed from, for example, metallic or insulating materials. Suitable materials include known materials such as steel, fused silica, or lined materials. The column can include more than one column, disposed in serial and/or parallel configurations. For example, the column can be a capillary column and can include multiple capillary tubes.

The instrument 400 optionally includes a control unit, such as a personal computer or workstation, that receives data from the modules 470, 480 and provides control signals to the modules 470, 480. The control unit supports, for example, automation of sample analyses. The control unit, in various alternative embodiments, is implemented in software, firmware, and/or hardware (e.g., as an application-specific integrated circuit), and includes, if desired, a user interface.

Variations, modifications, and other implementations of what is described herein will occur to those of ordinary skill in the art without departing from the spirit and the scope of the invention as claimed. For example, some embodiments of the invention encompass lab-on-a-chip approaches to chemical processing. Accordingly, the invention is to be defined not by the preceding illustrative description but instead by the spirit and scope of the following claims.

What is claimed is:

1. A method for making a fluid-processing apparatus for chemical analyses, comprising:
   providing a mixture of a colloidal suspension and a matrix material having an uncured state;
   applying at least a portion of the mixture to at least a portion of a surface of a conduit; and
   curing the applied mixture to form a cured conductive coating for applying a voltage to a fluid passing through the conduit.

2. The method of claim 1, wherein the colloidal suspension comprises graphite particles.

3. The method of claim 1, wherein the matrix material comprises at least one chemical selected from a chemical group of siloxane-based thermoset polymers.

4. The method of claim 3, wherein curing comprises heating at a temperature in a range of greater than about 90° C. to less than about 130° C.

5. The method of claim 4, wherein curing comprises heating for a length of time in a range of greater than about 6 hours to less than about 24 hours.

6. The method of claim 1, wherein the conduit comprises a capillary.

7. The method of claim 1, wherein applying comprises causing the mixture to flow in a direction substantially parallel to a length of the conduit.

8. The method of claim 1, wherein applying comprises positioning at least a portion of the conduit within a housing, and flowing the mixture through the housing into contact with the conduit.

9. The method of claim 1, wherein applying comprises causing the mixture to form a substantially uniform layer on at least the portion of the surface of the conduit.

10. The method of claim 1, wherein the portion of the surface of the conduit is proximate to at least an emission end of the conduit.

11. The method of claim 1, wherein the cured conductive coating is substantially hydrophobic.

12. The method of claim 1, wherein the conduit comprises a capillary having a sealed end.

13. The method of claim 12, further comprises cleaving or cutting the coated conduit to remove a portion of the conduit including the sealed end.

14. The method of claim 1, wherein the matrix material in the uncured state comprises a base material and a curing agent.

15. The method of claim 14, wherein providing the mixture comprises providing the matrix material in the uncured state by mixing a volume of the base material with a volume of the curing agent in a ratio selected from a range of about 8:1 to about 12:1.

16. The method of claim 1, wherein providing the mixture comprises selecting a ratio of a volume of the matrix material to a volume of the colloidal suspension from a range of about 1:2 to about 1:4.

17. The method of claim 1, wherein the matrix material in the uncured state is essentially free of ethyl acetate.

18. The method of claim 1, wherein the conduit comprises an electrically insulating material.

19. The method of claim 18, wherein the electrically insulating material comprises silica.

20. The method of claim 1, wherein the fluid-processing apparatus comprises an electrospray-ionization interface, a capillary electrophoresis apparatus, a capillary electrochromatography apparatus, or an electrokinetic pump.

21. An analytical instrument, comprising a chromatography module, a mass-spectrometry module, and the electrospray-ionization interface of claim 20 in fluid communication with the chromatography module and the mass-spectrometry module for converting an eluent received from the chromatography module into an electrospray aerosol for delivery to the mass-spectrometry module.

22. A method for analyzing a compound, comprising:
providing an analytical instrument comprising an electrospray-ionization interface fabricated by a method comprising the steps of,
mixing a colloidal suspension with a matrix material having an uncured state,
applying at least a portion of the mixture to at least a portion of a surface of an emitter conduit, and
curing the applied mixture to form a cured conductive coating for applying a voltage to a fluid passing through the emitter conduit to cause an electrospray aerosol to be emitted from the emitter conduit; and
unclogging a tip of the emitter conduit by cleaving or cutting the emitter conduit to remove a clogged portion of the emitter conduit.

23. A mass-spectrometry interface for electrospray ionization, comprising:

an emitter conduit; and a conductive layer adjacent to at least a portion of an exterior surface of the emitter conduit for applying a voltage to a fluid in the emitter conduit, the conductive layer comprising a cured mixture of an initially uncured matrix material comprising a siloxane-based thermoset polymer and a colloidal suspension of graphite particles, wherein the volume ratio of the uncured matrix material to the colloidal suspension is in a range of from about 1:2 to about 1:4.

24. The interface of claim 23, wherein the emitter conduit comprises a capillary.

25. The interface of claim 24, further comprising a chromatographic column directly attached to the capillary.

26. The interface of claim 23, wherein the thermoset polymer comprises poly(dimethyl siloxane).

27. The interface of claim 23, wherein the conductive layer has a substantially uniform thickness of greater than about 20 μm.

28. The interface of claim 23, further comprising a layer disposed between the emitter conduit and the conductive layer.

29. The interface of claim 23, wherein the emitter conduit does not have a pulled tip.

30. The interface of claim 23, wherein the cured siloxane-based thermoset polymer comprises a compound having a chemical structure of

wherein each R is selected from the group comprising H, $CH_2$, $CH_3$, $CH{=}CH_2$, $CH_2{=}CH_2$, $CH_3{\equiv}CH_3$, CHOH, aminoalkyl, and an hydroxyalkyl.

31. An analytical instrument, comprising:

a chromatography module;

a mass-spectrometry module; and an electrospray-ionization interface in fluid communication with the chromatography module and the mass-spectrometry module for converting an eluent received from the chromatography module into an electrospray aerosol for delivery to the mass-spectrometry module, the electrospray-ionization interface comprising, an emitter capillary, and a conductive layer adjacent to at least a portion of an exterior surface of the emitter capillary for applying a voltage to a fluid in the emitter capillary, the conductive layer comprising a cured mixture of an initially uncured matrix material comprising a siloxane-based thermoset polymer and a colloidal suspension of graphite particles, wherein the volume ratio of the uncured matrix material to the colloidal suspension is in a range of from about 1:2 to about 1:4.

32. A method for making an apparatus for chemical analyses, comprising:

mixing a colloidal suspension of graphite particles with a matrix material comprising a siloxane-based thermoset polymer, wherein the mixture has an uncured state;

applying at least a portion of the uncured mixture to at least a portion of a surface of a substrate; and curing the applied mixture to form a cured conductive coating.

33. A MALDI plate made by the method of claim 32.

34. A DIOS chip made by the method of claim 32.